(12) United States Patent
Holstensson

(10) Patent No.: US 6,533,359 B1
(45) Date of Patent: Mar. 18, 2003

(54) HEADREST DEVICE

(75) Inventor: Lars Holstensson, Nässjö (SE)

(73) Assignee: Ergonomiprodukter I Bodafors AB, Nässjö (SE)

( * ) Notice: Subject to any disclaimer, the term of this patent is extended or adjusted under 35 U.S.C. 154(b) by 0 days.

(21) Appl. No.: 10/030,712

(22) PCT Filed: Jul. 4, 2000

(86) PCT No.: PCT/SE00/01415

§ 371 (c)(1),
(2), (4) Date: May 20, 2002

(87) PCT Pub. No.: WO01/03969

PCT Pub. Date: Jan. 18, 2001

(30) Foreign Application Priority Data

Jul. 13, 1999 (SE) ............................................. 9902678

(51) Int. Cl.⁷ ................................................ A47C 7/36
(52) U.S. Cl. ....................................... 297/391; 297/409
(58) Field of Search ............................. 297/284.8, 391, 297/409

(56) References Cited

U.S. PATENT DOCUMENTS

| | | | |
|---|---|---|---|
| 4,339,150 A | * | 7/1982 | McNamara et al. ..... 297/284.8 |
| 4,657,304 A | | 4/1987 | Heesch |
| 4,762,367 A | | 8/1988 | Denton |
| 5,020,855 A | * | 6/1991 | Lindberg et al. ............ 297/391 |
| 5,088,790 A | | 2/1992 | Wainwright et al. |

\* cited by examiner

*Primary Examiner*—Peter R. Brown
(74) *Attorney, Agent, or Firm*—Browdy and Neimark, P.L.L.C.

(57) ABSTRACT

A headrest device, intended for a chair, a seat or the like having a substantially vertical backrest, has an attachment part (1), by means of which it is to be attached to the backrest, and a headrest (6), which is mounted on the attachment part (1). The headrest (6) is mounted on the attachment part (1) by means of two link arms (7, 8), which at one end are connected, pivotally about a substantially vertical pivot axis, to the attachment part (1) and which at the other end are connected, hingedly about a substantially vertical axis, to a respective nut element (15, 16). The nut elements (15,16) are threadingly engaged with a substantially horizontal screw (23), which is turnably attached to the headrest (6) and which is arranged, in turning, to synchronously displace the nut elements (15, 16) in opposite directions along the screw (23) and thereby to pivot the link arms (7, 8) about their pivot axes to change the horizontal distance of the headrest (6) from the attachment part (1).

4 Claims, 2 Drawing Sheets

HEADREST DEVICE

REFERENCE TO RELATED APPLICATIONS

The present application is the national stage under 35 U.S.C. 371 of international application PCT/SE00/01415, filed Jul. 4, 2000 which designated the United States, and which international application was published under PCT Article 21(2) in the English language.

The present invention relates to a headrest device intended for a chair, a seat or the like, which has a substantially vertical backrest, said device having an attachment part, by means of which it is to be attached to the backrest, preferably in a vertically adjustable manner, and a headrest, which is mounted on the attachment part.

The object of the present invention is to provide a headrest device, which in a simple manner is horizontally adjustable for adjustment to the user's sitting position on a chair, a seat or the like. The aim is to increase the user's comfort and, when the headrest device is used on a vehicle seat, to reduce the risk of whiplash injuries in case of collision.

According to the present invention, this object is achieved by means of a headrest device, which is of the kind stated by way of introduction and characterised in that the headrest is mounted on the attachment part by means of two link arms, which at one end are connected, pivotally about a substantially vertical pivot axis, to the attachment part and which at the other end are connected, hingedly about a substantially vertical axis, to a respective nut means threadingly engaged with a substantially horizontal screw means, which is turnably attached to the headrest and which is arranged, in turning, to synchronously displace the nut means in opposite directions along the screw means and thereby to pivot the link arms about their pivot axes to change the horizontal distance of the headrest from the attachment part.

Preferably, the two link arms each have at said one end a toothed segment, whose axis coincides with the pivot axis of the respective link arms, the link arms being interconnected by their toothed segments meshing with each other.

In a preferred embodiment, one of the nut means is left-hand threaded and the other nut means is right-hand threaded, and the screw means is left-hand threaded in the portion with which the left-hand threaded nut means is threadingly engaged and right-hand threaded in the portion with which the right-hand threaded nut means is threadingly engaged.

In a preferred embodiment, the screw means consists of two screw parts, which form an angle with each other and which are non-rotatably connected to each other by means of a joint coupling and of which one part comprises the left-hand threaded portion and the other part comprises the right-hand threaded portion.

Preferably, the screw means projects from the headrest with at least one end, and an operating knob for turning the screw means is attached to the projecting end.

The invention will now be described in more detail with reference to the accompanying drawings.

Figure 1:
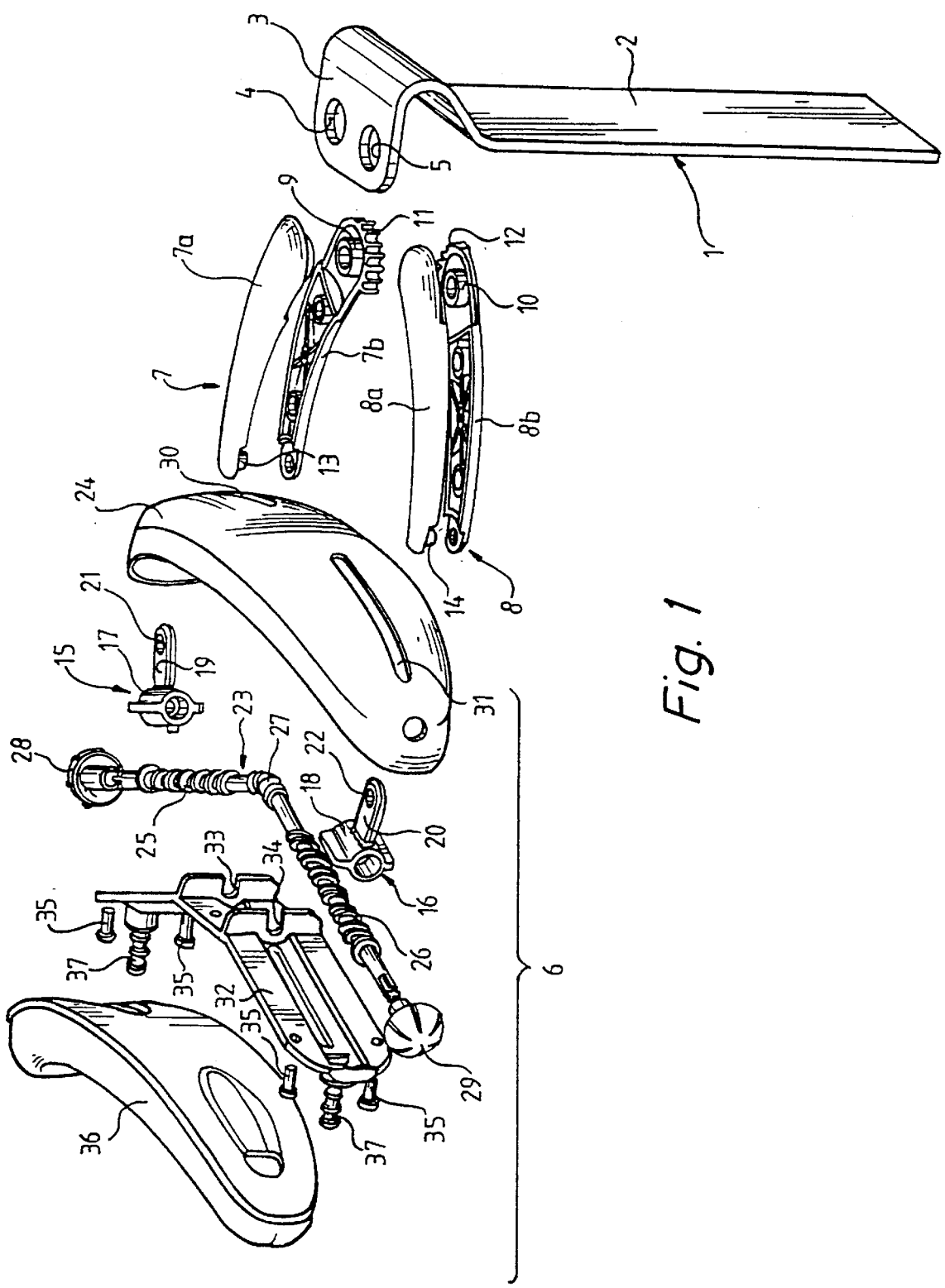
FIG. 1 is an exploded view of a headrest device according to the present invention.

The headrest device, which is shown in the drawings, has an attachment part 1, by means of which the device in prior-art manner is to be attached in a vertically adjustable manner to the backrest (not shown) of a chair or a seat. The attachment part 1 has a long, vertical leg 2, which is adapted to be inserted into a slot in the backrest, and a short, horizontal leg 3 having two juxtaposed through-holes 4 and 5.

Figure 2:
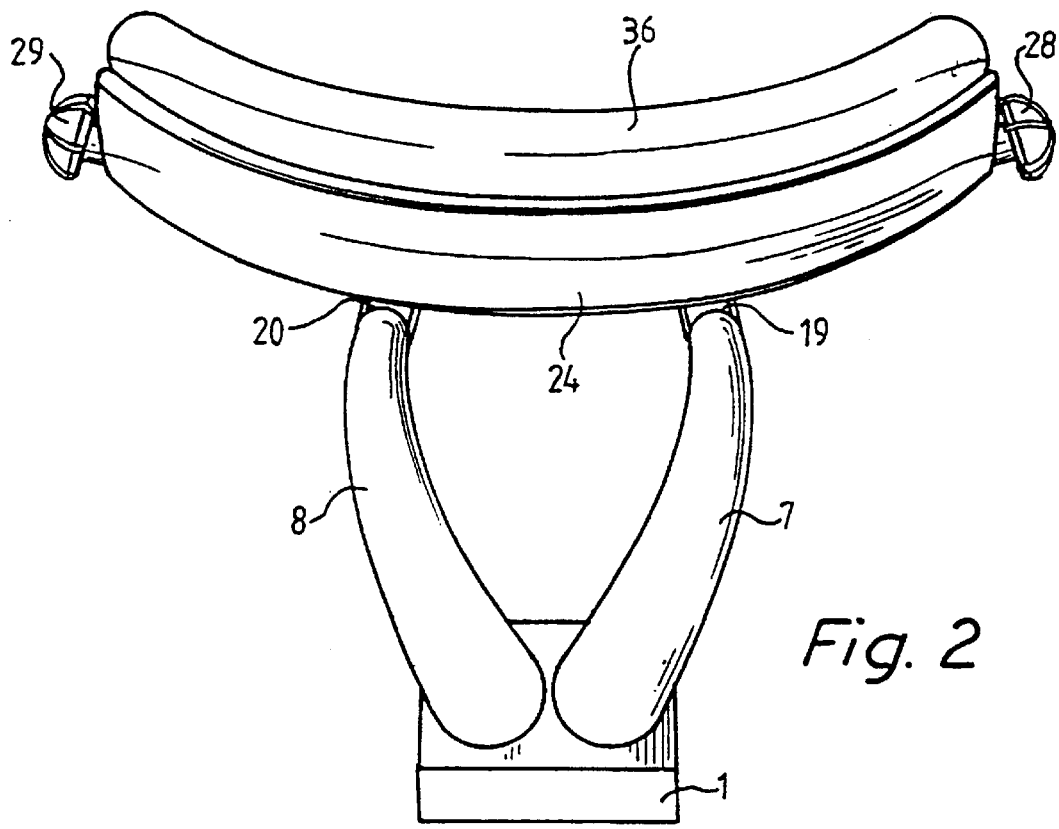
FIG. 2 and 3 are top plan views showing the headrest device in a first and a second setting position, respectively.
Figure 3:
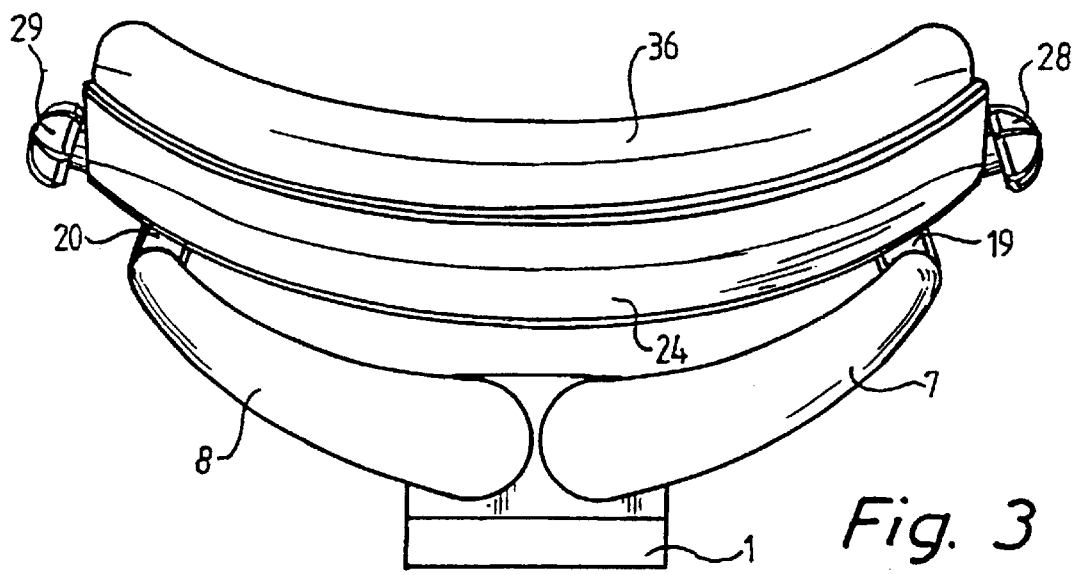

The headrest device also has a headrest 6, which is mounted on the attachment part 1 by means of link arms 7 and 8. The link arms 7 and 8 are somewhat arcuate and they each consist of an upper half 7a and 8a, respectively, and a lower half 7b and 8b, respectively, which are connected to each other, for instance, by means of screws. At one end, the link arms 7 and 8 have an internal, vertical bearing pin 9 and 10, respectively, which is turnably mounted in the hole 4 and 5, respectively, in the horizontal leg 3 of the attachment part 1. As a result, the link arms 7 and 8 are pivotable in relation to the attachment part 1 between a first end position, which is shown in FIG. 2, and a second end position, which is shown in FIG. 3. At the end where the bearing pin 9 and 10, respectively, is formed, the link arms 7 and 8 have a toothed segment 11 and 12, respectively, whose axis coincides with the pivot axis of the respective link arms. The two toothed segments 11 and 12 are in mesh with each other and thus ensure a uniform pivoting movement of the two link arms 7 and 8. At the other end, the link arms 7 and 8 also have an internal, vertical bearing pin 13 and 14, respectively.

A nut means 15 connects the link arm 7 to the headrest 6, and a nut means 16 connects the link arm 8 to the headrest 6. The nut means 15 and 16 consist of an internally left-hand threaded sleeve 17 and right-hand threaded sleeve 18, respectively, from which a flange 19 and 20, respectively, having a through-hole 21 and 22, respectively, projects horizontally in the lateral direction.

The nut means 15 and 16 are threadingly engaged with a screw means 23, which is turnably mounted in a cup-shaped mounting part 24 included in the headrest 6. The screw means 23 consists of two screw parts 25 and 26, which form an angle with each other and which are non-rotatably connected to each other by means of a joint coupling 27, which has the form of a flexible sleeve in the shown embodiment. The screw part 25 is left-hand threaded and threadingly engaged with the sleeve 17 of the nut means 15, and the screw part 26 is right-hand threaded and threadingly engaged with the sleeve 18 of the nut means 16. The two screw parts 25 and 26 each project at one end from the mounting part 24 and there they support an operating knob 28 and 29, respectively, by means of which the screw means 23 is turnable in the mounting part 24.

The flanges 19 and 20 of the nut means 15 and 16 each extend through a horizontal slit 30 and 31, respectively, in the substantially vertical bottom of the cup-shaped mounting part 24.

The link arm pins 13 and 14 are turnably mounted in the hole 21 and 22, respectively, in the flange 19 and 20, respectively. The link arms 7 and 8 are thus turnably connected to the nut means 15 and 16, respectively.

The screw means 23 and the nut means 15 and 16 are kept in place and guided in the cup-shaped mounting part 24 with the aid of guide means (not shown) arranged therein and a mounting plate 32, which is also provided with guide means, such as guide grooves 33 and 34, and which is attached to the mounting part 24 by means of screws 35.

The headrest 6 also includes a headrest cushion 36, which is replaceably attached to the mounting plate 32 by means of pins 37.

By manually turning the one and/or the other operating knob 28, 29, it is possible, as will be understood, to displace the headrest 6 horizontally in relation to the attachment part 1. The headrest 6 is horizontally displaceable in relation to the attachment part 1 between a maximally extended end position (FIG. 2) and a maximally retracted position (FIG. 3). Thus, the headrest 6 can be adjusted in a very simple manner in such a position that the headrest cushion 36 rests against the back of the user's head independently of his sitting position.

What is claimed is:

1. A headrest device intended for a chair, a seat or the like, which has a substantially vertical backrest, said device having an attachment part (1), by means of which it is to be attached to the backrest, preferably in a vertically adjustable manner, and a headrest (6), which is mounted on the attachment part (1), characterised in that the headrest (6) is mounted on the attachment part (1) by means of two link arms (7, 8), which at one end are connected, pivotally about a respective, substantially vertical pivot axis, to the attachment part (1), that the two link arms (7, 8) each have at said one end a toothed segment (11, 12), whose axis coincides with the pivot axis of the respective link arms, that the link arms (7, 8) are interconnected by their toothed segments (11, 12) meshing with each other, and that the link arms (7, 8) at the other end are connected, hingedly about a substantially vertical axis, to a respective nut means (15, 16) threadingly engaged with a substantially horizontal screw means (23), which is turnably attached to the headrest (6) and which is arranged, in turning, to synchronously displace the nut means (15, 16) in opposite directions along the screw means (23) and thereby to pivot the link arms (7, 8) about their pivot axes to change the horizontal distance of the headrest (6) from the attachment part (1).

2. A device as claimed in claim 1, characterised in that one of the nut means (15) is left-hand threaded and the other nut means (16) is right-hand threaded, and that the screw means (23) is left-hand threaded in the portion with which the left-hand threaded nut means (15) is threadingly engaged and right-hand threaded in the portion with which the right-hand threaded nut means (16) is threadingly engaged.

3. A device as claimed in claim 2, characterised in that the screw means (23) consists of two screw parts (25, 26), which form an angle with each other and which are non-rotatably connected to each other by means of a joint coupling (27) and of which one part (25) comprises the left-hand threaded portion and the other part (26) comprises the right-hand threaded portion.

4. A device as claimed in any one of claims 1–3, characterised in that the screw means (23) projects from the headrest (6) with at least one end, and that an operating knob (28, 29) for turning the screw means (23) is attached to the projecting end.

* * * * *